Sept. 10, 1935.  J. L. SETTLES  2,013,900
KITCHEN SHREDDER
Filed June 8, 1933
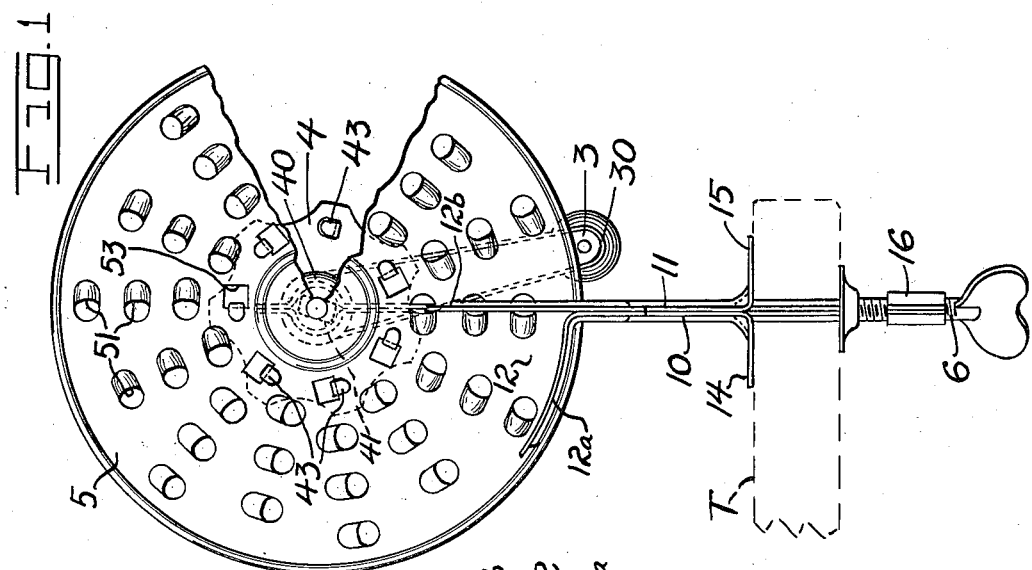
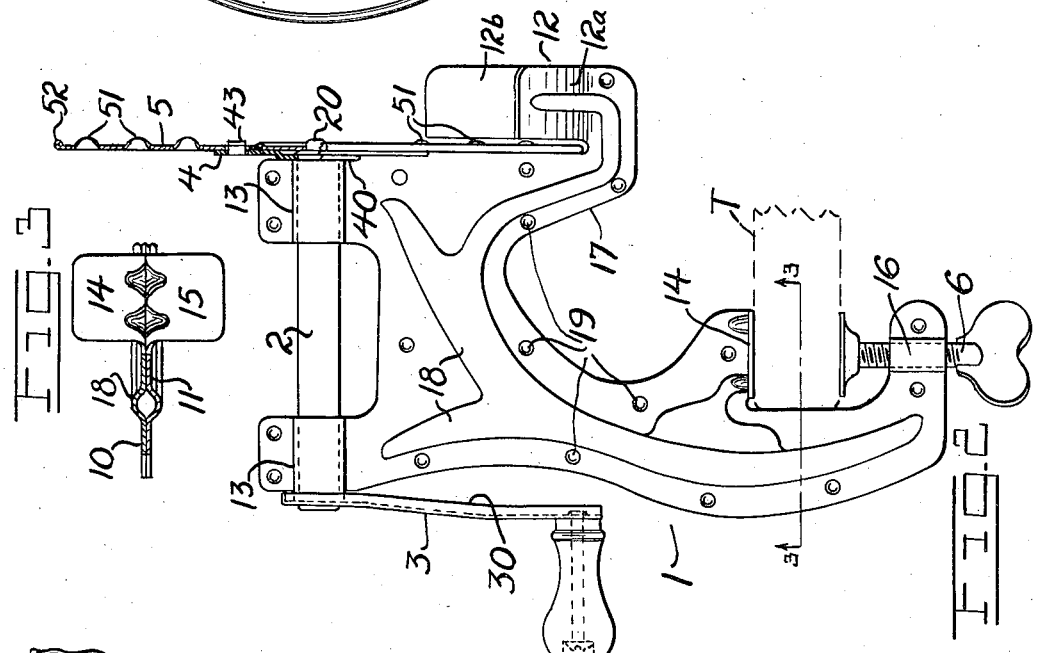
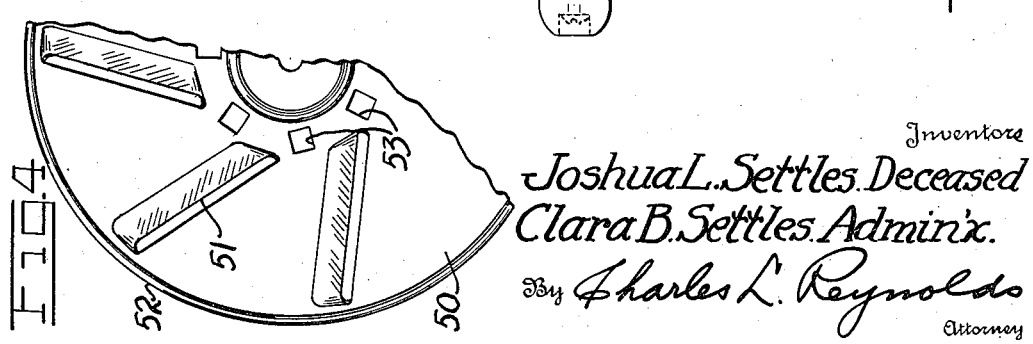
Inventor
Joshua L. Settles, Deceased
Clara B. Settles, Admin'x.
By Charles L. Reynolds
Attorney Patented Sept. 10, 1935

2,013,900

UNITED STATES PATENT OFFICE 2,013,900

KITCHEN SHREDDER

Joshua L. Settles, deceased, late of Seattle, Wash., by Clara B. Settles, administratrix, Seattle, Wash.

Application June 8, 1933, Serial No. 674,924

8 Claims. (Cl. 146—116)

This invention relates to a shredder for kitchen use in shredding, cutting or grating food, for instance, for shredding vegetables for use in salads, or for grating cheese.

It is essential that a grater for domestic use of this character be simply constructed and offer the minimum chance of getting out of order, but it is also essential that it be constructed in the simplest possible manner, and in such a way that it can be produced at very low cost, for instance, by stamping from sheet metal. A further essential is that it be easily kept clean, and hence that all parts be accessible. It is also desirable that it be provided with several different cutting devices, to the end that it can produce fine grating, coarse grating, and that it may cut off slices or shreds, as in the cutting of lettuce or cabbage, and it is preferable that the several cutters be interchangeably secured in place.

The object of this invention, therefore, is to provide a utensil of the character described, and one which, in addition to being simple, inexpensive, and sanitary, can be made rugged and reliable for use over extended periods.

To such end the invention comprises the novel parts and combinations thereof, as shown in the accompanying drawing, described in this specification, and as will be more particularly defined by the claims which terminate the same.

In the accompanying drawing the invention is shown in a form which is at present the preferred one.

Figure 1 is a face view of the device, shown from the working side.

Figure 2 is a side elevation of the same.

Figure 3 is a transverse section on the line 3—3 of Figure 2.

Figure 4 is a detail view of an alternative cutting disk.

Having in view economy and simplicity, the stand 1 is formed of two pieces of sheet metal, designated 10 and 11 to distinguish them. Such a stand is intended to be clamped to the edge of a table T, and in its upper portion supports a rotative shaft 2. Rotation of the shaft is accomplished by means of a handle 3 secured at one end of the shaft, and to the other end of the shaft is secured a plate 4. This plate is preferably stamped from light sheet metal, and may have a boss 40 formed in it, one purpose of this boss being to receive securing means 41 whereby the plate is secured to the shaft.

A cutting or grating disk is secured upon the shaft by means of interengagement between such a disk and the plate 4. The disk may take various forms, and there has been illustrated in Figure 1 a coarse grating disk 5, and in Figure 4 is shown an alternative form consisting of the cutting or shredding disk 50. In each instance appropriate cutting edges are provided, as indicated at 51, struck up from the metal of the disk and sharpened. Since these disks must be made inexpensively, it is preferred that they be formed of light sheet metal, and to stiffen them somewhat they may be provided with a peripheral roll or flange 52.

To hold the disk to the plate 4 there is provided in one of them, preferably in the disk, a series of angularly spaced holes 53 near the center, and the other member is provided with hooks 43 struck up from the metal and angularly spaced in similar manner, whereby the hooks may be engaged within the holes 53, facing in such a direction that the natural rotation of the shaft and handle, having reference to the position of the cutting edges 51 and to the location of the work support 12, will tend to maintain the hooks engaged. Preferably the hooks are formed on the plate 4, and the holes 53 are formed in the several disks, which are thus interchangeable. No other means is necessary for holding the disks in place, though it may be desirable to provide a centering pin 20 projecting through a central aperture in the disk, the pin 20 being formed as part of or supported in the end of the shaft 2.

By forming the stand 1 of two plates of sheet metal it is possible to preform in the two halves journal bearings 13 at the upper end, which when the plates are put together encloses the shaft 2. Also adjacent the lower end of the stand the plates 10 and 11 may each be bent outward and separated, as indicated at 14 and 15, to form a foot which rests upon the top of the table. Cooperating with this foot is a further extension downward of the plates, where they are again separated and threaded to form a nut 16 for the reception of a clamping bolt 6, which is threaded in this nut. The table top is clamped between the foot 14, 15 and the clamping nut 6.

To form the work holder 12, the plates forming the stand may be projected somewhat downward and outward from an intermediate portion beneath the lower edge of the disk, as shown at 17 in Figure 2, and thence upward at the working face of the disk. There the two plates may be separated, as indicated at 12a and 12b, to form a support whereon may be placed a vegetable or other material being shredded, cut or grated.

Pressure of the material being worked upon against the rather flimsy disk 5 or 50 would tend to deform it from the plane of rotation, and to prevent this the stand is formed to contact with the back face of the disk, as may be seen in Figure 2. Not only does the stand contact with the back face of the disk, but also with the back face of the plate 4 and the back side of the boss 40. Thus the bearing of the boss 40 against the end of the stand, or the end of the journal 13, forms a thrust bearing, and the contact of the stand with the plate and disk resists deformation due to pressure from the working face. It also serves a further purpose in that severed material, instead of being carried around with the disk and perhaps being thrown away from the dish beneath the disk by centrifugal action, is wiped off and caused to drop into the dish placed immediately beneath the disk. To this end the portion 12b of sheet 11 is in the general plane of this sheet.

In order to stiffen the sheets forming the stand 1 there may be impressed in them suitable stiffening ribs, as indicated at 18. Similarly, to stiffen the handle 3 it may be provided with a flange 30. The two plates are secured together, as has been indicated, by spot welding or like simple, inexpensive means, as indicated at 19.

The several parts may be made up as stampings, assembled, and spot welded, whereupon the assembly is completed, and thus the entire device may be made very inexpensively, and may be sold at a low price, enabling quantity production and distribution.

What is claimed is:

1. A rotary shredder comprising a stand, a rotary shaft journaled therein, a light sheet metal plate secured to said shaft to rotate therewith, a light sheet metal disk having grating or cutting edges, means to secure the disk upon the face of said plate, a work support adjacent the cutting face of said disk, including a plate disposed generally in the plane of the stand, and another plate extending laterally therefrom and disposed transversely of said disk, and said stand engaging the back faces of the plate and disk, to resist pressure of the work against the opposite face, and to wipe off severed material.

2. A rotary shredder comprising a vertically disposed stand, a rotary shaft journaled therein, a light sheet metal plate secured to said shaft to rotate therewith, a light sheet metal disk having grating or cutting edges, means to secure the disk upon the face of said plate, a work support adjacent the cutting face of said disk, including a vertically disposed plate coplanar with the stand and a second plate extending laterally therefrom and disposed transversely of said disk, and said stand engaging the plate and disk on the face opposite the cutting face of the latter, to resist deformation from the plane of rotation.

3. A rotary shredder comprising a rotary shaft, and a cutting or grating disk secured thereon, and a stand comprising two complemental substantially flat sheets of metal permanently joined in face to face relationship, and disposed in a plane radially of the shaft, and separated to form a journal for said shaft, and also extending from the back side to the cutting side of the disk, and separated to form a support for material being cut or grated.

4. A rotary shredder comprising a rotary shaft and a cutting or grating disk secured thereon, and a stand formed of two substantially flat sheets of metal permanently joined in face to face relationship, lying in the plane of the shaft's axis and separated to form a journal for the same, and extending thence downward to a point beneath the disk and again separated to form a table-top engaging foot, and extending further downward and separated to form a nut, a clamping screw threaded in said nut and cooperating with said foot.

5. A rotary shredder comprising a rotary shaft and a cutting or grating disk secured thereon, and a stand formed of two substantially flat sheets of metal joined in face to face relationship, lying in the plane of the shaft's axis and separated to form a journal for the same, and extending thence downward to a point beneath the disk and again separated to form a table-top engaging foot, and extending further downward and separated to form a nut, a clamping screw threaded in said nut and cooperating with said foot, and said sheets, above the foot, extending beneath the disk and then upwardly at the cutting face of the disk, and there being separated to form a support for material being cut or grated.

6. A rotary shredder as in claim 3, one sheet in the work support extending upright within the general plane of such sheet in the stand, to restrain movement of material under the influence of rotation of the disk, and the other sheet being separated therefrom, to support the work.

7. A rotary shredder comprising a rotary shaft, a cutting or grating disk secured thereon, and a stand comprising two substantially flat sheets of metal lying in parallel planes disposed substantially radially of the shaft, said plates being secured together, and being separated to extend about opposite sides of the shaft to form a journal therefor, and also extending from the back side to the cutting side of the disk, and being there separated to form a support for material being cut or grated.

8. A rotary shredder comprising a rotary shaft, a cutting or grating disk secured thereon, and a stand comprising two substantially flat sheets of metal joined in face to face relationship and disposed substantially radially of the shaft, said plates being secured together, and being separated to extend about opposite sides of the shaft to form a journal therefor of a length exceeding the thickness of the sheets, and extending downward below the disk and there separated to form a table-top engaging foot.

CLARA B. SETTLES,
*Administratrix of Joshua L. Settles, Deceased.*